H. WAKEMAN.
HAND-CRANKS FOR CAR-BRAKES.
No. 171,749. Patented Jan. 4, 1876.
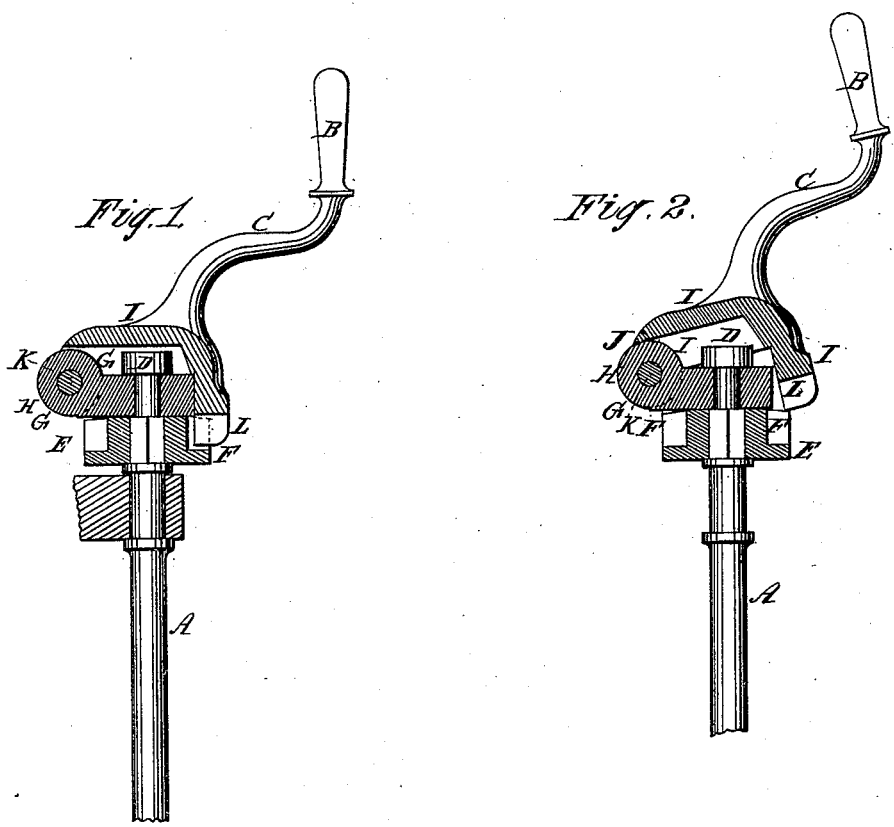
Fig. 1. Fig. 2.
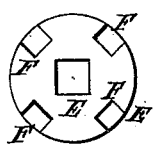  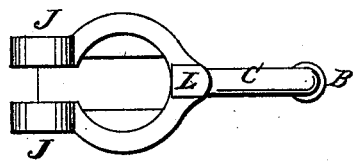
Fig. 3. Fig. 4. Fig. 5.
Witnesses
R. Bocklen
Joseph B. Roe
Inventor
Harwood Wakeman

UNITED STATES PATENT OFFICE.

HARWOOD WAKEMAN, OF NEW YORK, N. Y.

IMPROVEMENT IN HAND-CRANKS FOR CAR-BRAKES.

Specification forming part of Letters Patent No. 171,749, dated January 4, 1876; application filed September 23, 1875.

*To all whom it may concern:*

Be it known that I, HARWOOD WAKEMAN, of the city, county, and State of New York, have invented certain new and useful improvements in devices for disengaging the hand-crank from the brake-arbor of car-brakes, to prevent accident from said crank in releasing the brake. The following is a specification of said improvements, reference being had to accompanying drawings and letters of reference marked thereon.

The object of this invention is to have the hand-crank of the brake-arbor engageable by its own weight or a little down pressure, and having it disengageable by a limited, partly radial, inward and upward pressure, and to have the device to operate without the use of a spring, and otherwise of a simple and durable construction, capable of being operated by the ordinary person engaged for the purpose, without any special instruction, in a rapid and convenient manner.

The improvements relate to the combination and arrangement of two fixed collars on the upper end of the brake-arbor, one of which has a series of cavities on its periphery, and of a loose collar held between said fixed collar and the brake-handle, provided with a projection to engage in said cavities, and being hinged or pivoted to said loose collar on the opposite side of its crank, so that by the weight of said crank or a limited pressure said projection is caused to engage with the cavities of said fixed collar, and that, by a limited radial inward and upward pressure against the crank-handle, said projection is caused to disengage with said cavities, and thereby allow the brake-arbor to pass loose in said crank, and allow it to unwind liberally.

In the annexed drawings, Figure 1 represents a vertical section of the brake-arbor and handle constructed according to my improvements, the arbor and top part of the handle shown in full, and the handle shown in position while engaged with the arbor. Fig. 2 is a similar view, but the brake-handle shown in position while disengaged from the arbor. Fig. 3 is a detached top view of the lower fixed collar with the cavities. Fig. 4 represents a detached top view of the loose collar. Fig. 5 is a detached bottom view of the brake-handle.

A represents the vertical brake-arbor; B, the handle of the brake-crank C. Upon the top end of said arbor is a small fixed collar, D, which is secured in any suitable manner permanently thereto. A short distance below said small collar is a secondary large fixed collar, E, which is also permanently fixed upon the arbor. The collar E has on its periphery several equally-distributed cavities F. The portion of the arbor between said collars is made round and smooth, and upon it is employed a loose collar, G, which is fitted close, but loose, between said collars, so as to allow the arbor to revolve freely therein. Said loose collar has a vertical eye, H, extending from its periphery, as shown. The brake-crank C has formed on its base a cap, I, which has the dimension to cover the top and down the sides of said loose collar G, and has also two vertical eyes, J J, which extend opposite the crank, and said eyes are made of equal dimension with the eye H, which is fitted between them. By means of a central pivot, K, the said eyes J, and also through the eye H, said loose collar and base of the crank are hinged or pivoted together. On the lower portion of said cap I, and directly under the crank, is cast or secured a downward-projecting tooth, L, which has a dimension to enter readily in any of the cavities F which may be under it.

The upper portion of the cavity in the said cap I is sufficiently wide to allow the small collar D to work liberally therein, so that by these means whenever the brake is desired to be wound, or the brake-handle crank desired to be engaged with the brake-arbor, the operator begins to turn the crank in the usual direction, and by its own weight, or a limited downward and outward pressure, the tooth L under it meets one of the cavities F in the fixed collar E, and consequently enters therein, thereby engaging the arbor, as shown in Fig. 1. By continuing the rotation of the crank the brake is wound up. Whenever the brake is desired to be released, before the operator releases the usual pawl (the pawl holding the brake-arbor) he draws the crank-handle upwardly and inwardly, thereby raising the tooth L from the cavity F, in which it had engaged, and, while holding the crank, he disengages the said pawl with his foot, and the arbor is allowed to revolve loosely in the handle until the brake is unwound, as shown in Fig. 2.

I claim as my invention—

1. In disengageable crank-handles for brake-arbors, the pivoted crank-handle C, with the tooth L, and the loose collar G, to engage and disengage, as described, with the cavities F of the fixed collar E upon the arbor of the brake, substantially as herein set forth.

2. The combination and arrangement of the cap I with the pivoted loose collar G and tooth L, and cavities F, substantially as and for the purpose herein stated.

In witness whereof I hereunto set my hand this 21st day of September, 1875.

HARWOOD WAKEMAN.

In presence of—
JOSEPH R. ROE,
REINHOLD BOEKLEN.